United States Patent [19]
Markowitz et al.

[11] Patent Number: 5,463,547
[45] Date of Patent: Oct. 31, 1995

[54] PORTABLE TRADE RECORDATION SYSTEM INCLUDING MEANS FOR ABBREVIATED ENTRY OF DATA

[75] Inventors: Arthur D. Markowitz, Harrington Park, N.J.; John J. Sabo, Wilton, Conn.

[73] Assignee: New York Mercantile Exchange, New York, N.Y.

[21] Appl. No.: 384,259

[22] Filed: Jan. 27, 1995

Related U.S. Application Data

[63] Continuation of Ser. No. 126,109, Sep. 23, 1993, abandoned, which is a continuation of Ser. No. 511,053, Apr. 19, 1990, abandoned.

[51] Int. Cl.$^6$ .................................. G06F 153/00
[52] U.S. Cl. ............................. 364/408; 395/149
[58] Field of Search ..................... 395/149, 157, 395/158, 155, 710.04; 364/408, 401, 406

[56] References Cited

U.S. PATENT DOCUMENTS

| | | | |
|---|---|---|---|
| 4,115,870 | 9/1978 | Lowell | 379/96 |
| 4,677,552 | 6/1987 | Sibley, Jr. | 364/408 |
| 4,763,356 | 4/1988 | Day, Jr. et al. | 395/149 |
| 4,823,265 | 4/1989 | Nelson | 364/408 |
| 4,903,201 | 2/1990 | Wagner | 364/408 |
| 5,038,284 | 8/1991 | Kramer | 364/408 |
| 5,070,536 | 12/1991 | Mahany | 455/67.4 |

OTHER PUBLICATIONS

Pascal with Applications in Science and Engineering, Susan Finger and Ellen Finger, 1986 531–532.
Microsoft Press Computer Dictionary Second Edition, 1993, pp. 70, 91, 164, and 333.
V. Kulkosky, "Shrinking Technology Puts Power In Users' Hands", Wall Street Computer Review, Mar. 1991.
W. T. Taylor, "CBOE's Automation Plan: Keep The Floor Tuned In", Wall Street Computer Review, Mar. 1988.
M. Ritson, "The CME Comes Out Tops", Banking Technology, May 1989.

*Primary Examiner*—Gail O. Hayes
*Assistant Examiner*—C. Butterworth
*Attorney, Agent, or Firm*—Rogers & Wells

[57] ABSTRACT

A portable trade recordation and submission system comprising a hand-held computer terminal with a removable storage device. The software program in the system provides display screens for sign-on, set date/time, account setup, futures/options trade detail, review of positions and evaluate positions. Transaction data pertaining to trades may be entered in the system via the display screens and stored in the removable storage device. Thereafter, the removable storage device containing the transaction data may be provided to a clearing member for submission to the commodities exchange via the clearing member's normal means of trade submission.

4 Claims, 14 Drawing Sheets

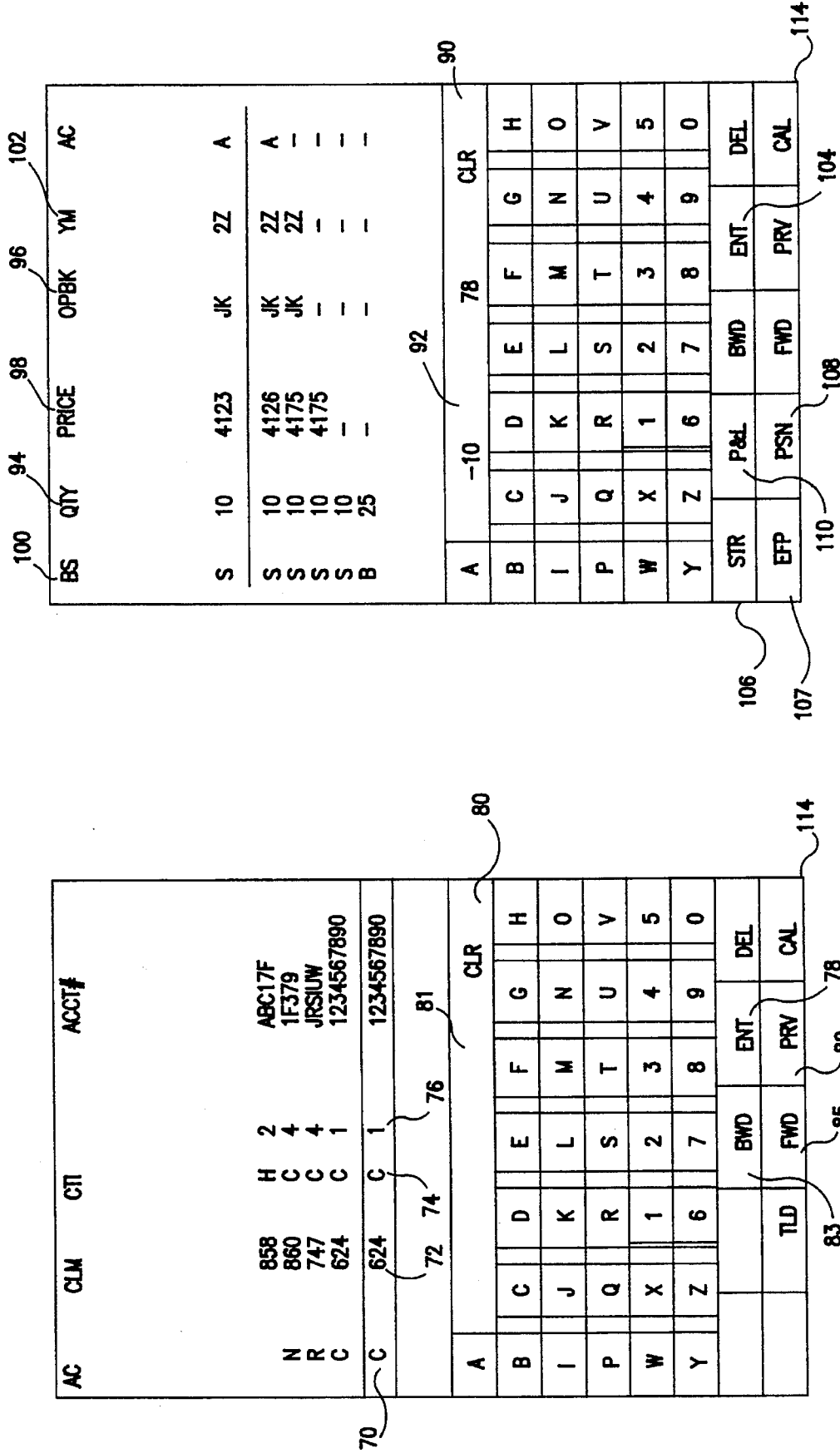

|   | PC | STRIKE | BOUGHT | SOLD |
|---|----|--------|--------|------|
| J | C | 380 | 15 | 10 |
| K | C | 400 | 5 | 20 |
| Q | C | 420 | 20 | 10 |
| Z | C | 440 | 2 | 0 |
| TOTAL | | | 42 | 40 |
| J | P | 380 | 4 | 8 |
| K | P | 400 | 10 | 2 |
| Q | P | 420 | 2 | 10 |
| Z | P | 440 | 15 | 5 |
| TOTAL | | | 31 | 25 |

| | | | | | BWD | FWD | | PRV | | CAL |

FIG. 11

| YM | P&L | PSN | MKT |
|----|-----|-----|-----|
| F | 0 | 0 | [+] |
| G | 0 | 0 | [+] |
| H | 0 | 0 | [+] |
| J | 160840 | 4 S | [+] |
| K | 0 | 0 | [+] |
| M | 0 | 0 | [+] |
| N | 0 | 0 | [+] |
| Q | 0 | 0 | [+] |
| U | 0 | 0 | [+] |
| V | 0 | 0 | [+] |
| X | 0 | 0 | [+] |
| Z | 766600 | 24 S | [+] |
|   | 927440 | TOTAL | |

CLR

| | | | | | | 7 | 8 | 9 |
| | | | | | | 4 | 5 | 6 |
| | | | | | | 1 | 2 | 3 |
| | | | | | | | | 0 |

| YR | | | | DEL | |
| | PSN | | PRV | CAL |

FIG. 12

CALCULATOR

410 X 50 =
20500.000000

415.5 − 410.2 =
5.300000

| CLR | | | | | | | | | 0 | |
|---|---|---|---|---|---|---|---|---|---|---|
| | | | | | | | 7 | 8 | | 9 |
| | | | | | | | 4 | 5 | | 6 |
| | | | | | | | 1 | 2 | | 3 |
| | | | | | | | = | + | | X |
| | | | | | | | . | − | | / |
| | | | | | | | | DEL | | |
| | | | | PRV | | | | | | |

PORTABLE TRADE RECORDATION SYSTEM INCLUDING MEANS FOR ABBREVIATED ENTRY OF DATA

This is a continuation of application Ser. No. 08/126/109, filed on Sep. 23, 1993 now abandoned, which is a continuation of Ser. No. 07/511,053 filed on Apr. 19, 1990 now abandoned.

REFERENCE TO MICROFICHE APPENDIX

Incorporated herein are appendices consisting of 14 microfiche and 182 frames. A table of contents listing these microfiche appendices is set out at the end of the detailed description.

BACKGROUND OF THE INVENTION

This invention relates to automated trading systems, and, more particularly, to hand-held systems for automated trade recordation and submission.

Commodity futures exchanges, by law, are required to execute trades for customer accounts and trades for brokers' and traders' (a broker trades for customers and in some cases for his/her personal account and a trader trades only for his/her personal account) personal accounts through open outcry in trading areas, rings or pits. Immediately after trade execution the details of trades are manually recorded on brokers' trading cards and/or order tickets and the time of trade execution is also manually recorded to the nearest minute. As soon as practicable, the trade information is manually edited, validated and the trade is allocated to appropriate accounts at one or more clearing members (relatively large firms that clear and margin trades for brokers and traders and their customers) and subsequently submitted to the commodity exchange for timely trade checking, trade matching (matching of the buy transaction against the sell) and overnight clearing and margining of positions. The trade submission time between the time of trade execution and submission to the exchange can range anywhere from 15 minutes to several hours.

Virtually all of the commodities exchanges have developed sophisticated systems to permit the traders and clearing members to submit the trades to the exchange through automated systems, once all of the manual processes are completed. Clearing members can submit trades through batch and real-time computer-to-computer communications lines which connect their own back office computers to the exchanges and brokers and clearing members can also submit trades through on-line CRT terminals directly connected to the exchanges' computers. The on-line terminal network also can be used, in many cases, to retrieve and correct erroneously entered trade data.

While exchanges have successfully automated the trade entry, matching and clearing processes, a void in automation exists within the trading rings and pits thereby requiring the inefficient manual trade recordation, audit trail timing, trade data transcription and the relatively large delays caused by these processes prior to trade submission, checking, matching and clearing. These delays require more manual work on the part of the traders, brokers, clearing members and their clerks in checking and correcting trades manually as a result of the slowness of trade entry. In addition, all of the parties to a trade are somewhat exposed in the market the longer that trade submission and matching is delayed.

Consequently, there is a need to automate the trade recordation and audit trail timing of trades much earlier in the entire trading process and eliminate constraints and inefficiencies in this process such as: (1) the relatively long time that may elapse between trade execution and submission to the exchange; (2) errors in trade recordation by brokers and traders and transcription by clerks; (3) errors in the manual recordation of time of execution (audit trail time); (4) the elapsed time associated with entering trade data into trade processing computers; and (5) potential errors in tracking traders' market positions and the values thereof.

SUMMARY OF THE INVENTION

With the foregoing in mind, it is an object of the invention to provide a portable trade recordation and submission system for capturing trade information immediately after execution in machine readable form.

It is a further object of the invention to provide a portable trade recordation and submission system with capability for faster data entry and trade verification.

It is a further object of the invention to provide a portable trade recordation and submission system which eliminates errors in transcription.

It is a further object of the invention to provide a portable trade recordation and submission system which provides a more accurate audit trail.

It is a further object of the invention to provide a rapid and flexible method of data entry.

The portable trade recordation and submission system according to the invention comprises a hand-held computer terminal with a removable storage device. The portable trade recordation and submission system may use an AGS-NYNEX computer which has a touch screen display. Additionally, it has a removable 128K RAM card which can be used for transaction data submission. The terminal can also submit trade data through direct radio frequency ("RF") spread spectrum transmissions.

In accordance with the software program in the portable trade recordation and submission system, six primary screens may be displayed: sign-on, set date/time, account setup, futures/futures options trade detail, review positions, and evaluate positions via a profit and loss calculation based on market price. The sign-on screen allows the user to enter a four character password (or change password), alphabetic or numeric broker code, and commodity code. The set date/time screen allows the user to enter the current date and time.

The account setup screen allows the user to enter an abbreviated account code, clearing member number, house/customer code, customer type indicator code and full clearing account number for as many accounts as required. The futures/futures options trade detail screen allows the user to enter, for each trade executed on the trading floor, price, buy/sell code, contract year/month, quantity, abbreviated account code and opposite broker (and put/call indicator and premium, for options trades). The review positions screen allows the user to display the current long and short positions by contract month and the overall total position. The profit and loss screen displays a mathematical evaluation of positions by contract month and permits marking of positions to current market prices. A calculator screen provides a four function calculator.

Transaction data pertaining to trades may be entered into the portable trade recordation and submission system in a rapid and flexible manner at approximately 2–6 seconds per trade via the display screens and stored in both fixed storage and removable storage. Thereafter, the removable storage device, with the transaction data therein, may be provided to a clearing member or broker for submission to an exchange via the clearing member's normal means of trade data submission. Trade data may also be submitted directly to the exchange via RF spread spectrum transmission to the exchange's trade processing computer.

BRIEF DESCRIPTION OF THE DRAWINGS

The accompanying drawings, referred to herein and constituting a part hereof, illustrate preferred embodiments of the invention and, together with the description, serve to explain the principles of the invention, wherein:

FIG. 7 illustrates an account setup screen displayed by the portable trade recordation and submission system;

FIG. 8 illustrates a futures trade detail screen displayed by the portable trade recordation and submission system;

FIG. 11 illustrates a review positions-options screen displayed by the portable trade recordation and submission system;

FIG. 12 illustrates a profit and loss screen displayed by the portable trade recordation and submission system; and FIG. 13 illustrates a calculator screen displayed by the portable trade recordation and submission system.

DETAILED DESCRIPTION OF THE DRAWINGS

The portable trade recordation and submission system according to the invention utilizes an AGS-NYNEX computer [model no. HPC/100] which will easily fit into the palm of the hand and has a touch screen display. The touch screen technology and the size of the machine lend themselves to broker and trader use on commodities and options exchanges. Additionally, it has a removable 128K RAM card with battery backup which can be used for trade safe-storage and submission, two RS232C serial ports, 256 kilobytes of non-volatile RAM, and up to one megabyte of dynamic RAM. The processor (80C88) will operate at eight megahertz with no wait states. Power is provided via a battery pack, providing up to 10 hours of use with no special power management software and longer with such software.

Figure 1:
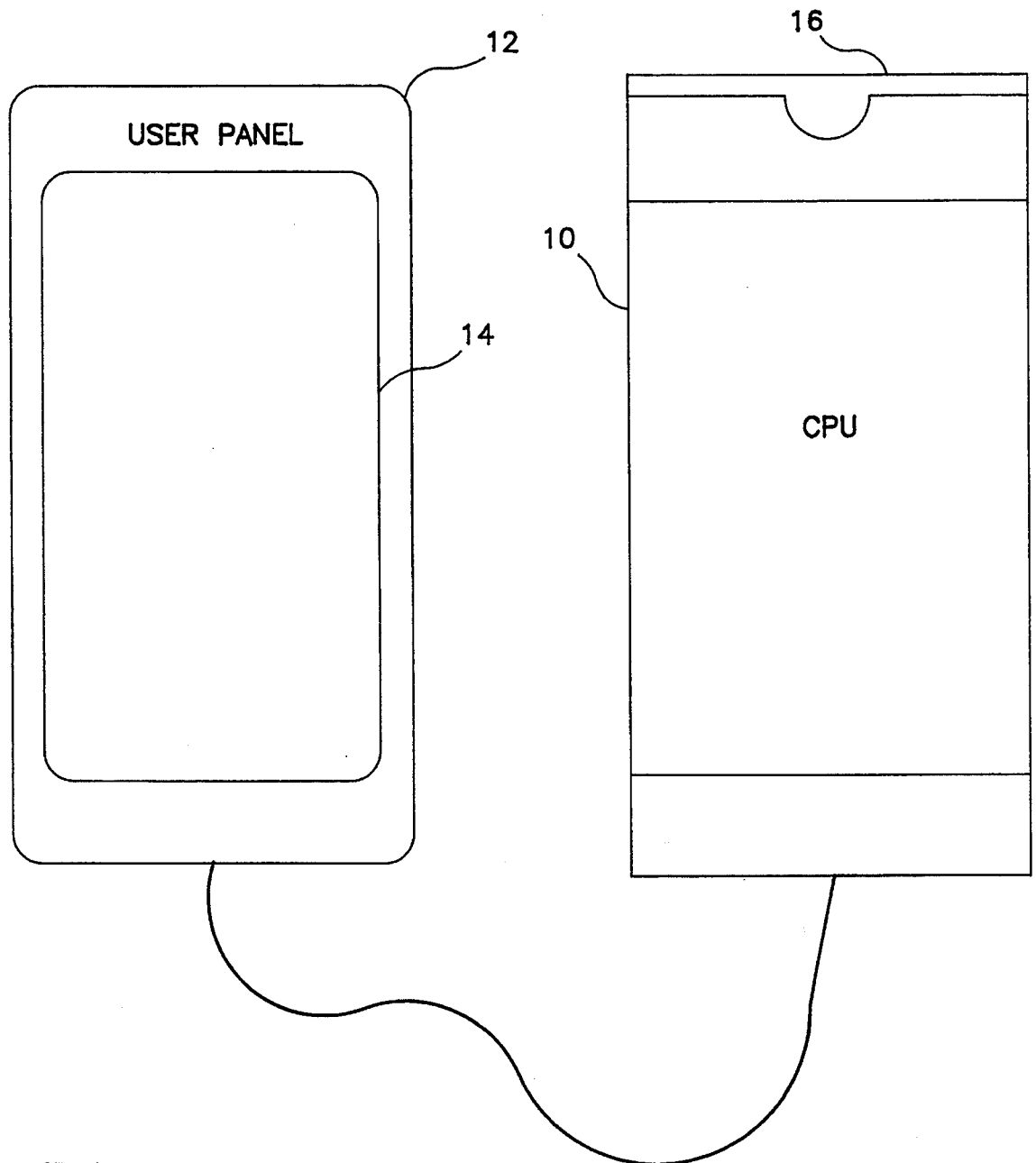
FIG. 1 is a plan view of the portable trade recordation and submission system according to the invention.
Figure 2:
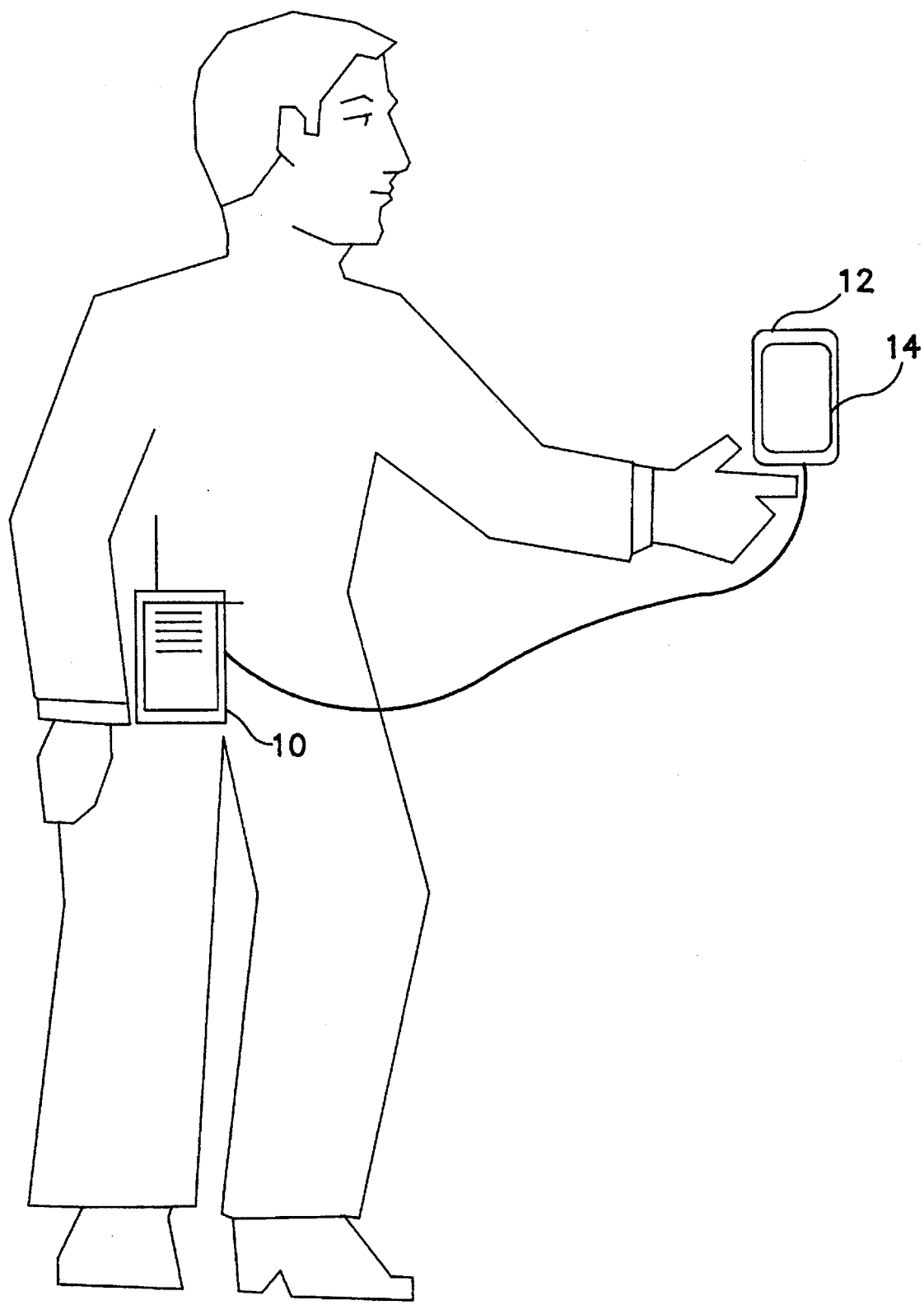
FIG. 2 illustrates a user holding the portable trade recordation and submission system.

The portable trade recordation and submission system according to the invention may be a two piece unit comprised of a belt mounted CPU portion 10, and a hand-held display-input portion 12 as shown in FIGS. 1 and 2. The combination of the two portions may provide the functional equivalent of an IBM PC/XT with a touch-screen display 14 which is MDA (monochrome display adapter) and CGA (color graphics adapter) compatible. The portable trade recordation and submission system may be fully compatible with the IBM PC/XT at all levels, including the hardware, firmware, ROM BIOS and ROM DOS.

The portable trade recordation and submission system may provide both internal RAM storage and removable RAM card storage capabilities. Although RAM storage is volatile and is not therefore an ideal storage mechanism, the machine is "backed-up" by a main battery as well as a back-up battery. This provides a measure of acceptable back-up for transaction data stored in RAM. The removable RAM card is a safe-store medium and will be relied upon for recovery in all cases of system failure and for trade submission.

At the start of each trading day, the user will load a fresh RAM card (i.e., a removable storage device) and turn on the machine. Periodically, the user will have to remove the RAM card and insert a new one depending on the required trade submission frequency mandated by exchange rule.

As an alternative to submitting transaction data to an exchange by removable storage device, the portable trade recordation and submission system may communicate directly with a central computer via a wireless local area network, for example, a NYNEX wireless local area network ("LAN").

The NYNEX wireless local area network interconnects a large number of portable terminals and/or computer(s) located in a single premise without cabling. It uses spread spectrum radio frequency technology, in a manner similar to cellular telephones, to allow this interconnection.

Figure 3:
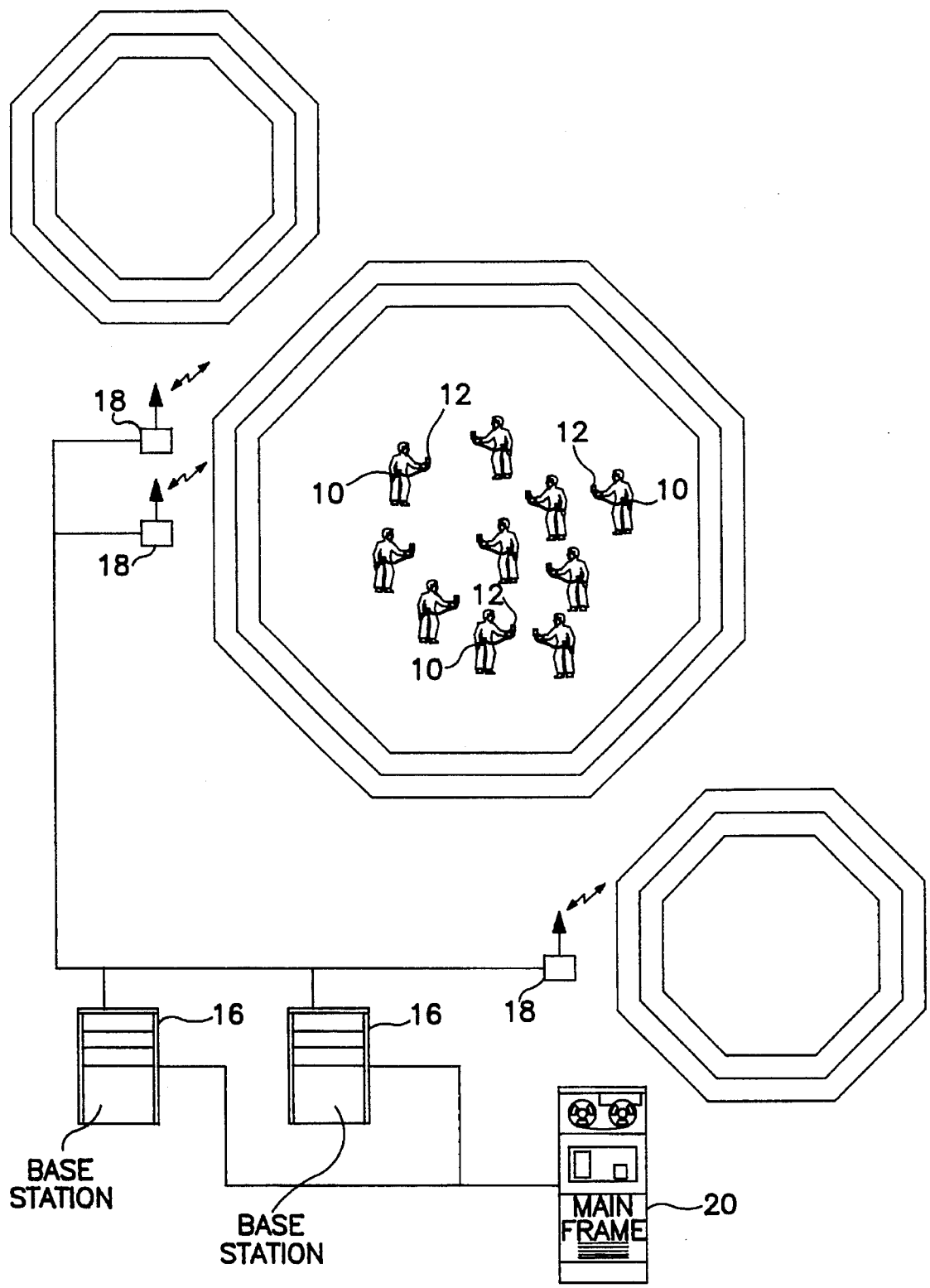
FIG. 3 illustrates an embodiment of the portable trade recordation and submission system using a wireless RF spread spectrum local area network.

A typical system, shown in FIG. 3, includes a "basestation" 16, which supplies the link between the wireless LAN and customer equipment (wired LANs, SNA networks, mainframes, minis, etc.) 20. The base station 16 also includes network management facilities and, possibly, customer specific application software. For very large premises there may be several base stations interconnected with standard wired networking arrangements. Connected to the base station(s) are a number of fixed radio transceivers 18 which provide complete radio coverage to all areas of customers premises.

Although the maximum signalling rate for a given environment varies from 250 Kbits/s to 1 Mbit/s, this may be inadequate for carrying large amounts of data to many sites. The wireless LAN can be cellularized, however, with each cell having this same 250 Kbits/s to 1 Mbit/s capacity. A cell, then, may be composed of a fixed transceiver and several mobile transceivers, and many cells may be combined into a single logical network. This can be carried further by providing multiple base stations interconnected by a high speed wired network.

The transceivers may be controlled by a microcomputer which will also handle all the packet assembly, disassembly and radio link control activities. The entire transceiver may be designed as a belt-pack, and will include the controller, transmitter, receiver, batteries, antenna and interface to the portable trade recordation and submission system.

There may be provided two base stations, each station capable of carrying the entire traffic load. It is expected that commodities exchanges' host computers would share the load between base stations, but would route all traffic to a single base station on receipt of appropriate status messages indicating that the other base station is non-functional.

The operation of the portable trade recordation and submission system in accordance with FIGS. 4A–4F will now be described. It will be appreciated by those skilled in the art that the operation of the system described hereinafter may be effected by use of either a stylus or finger.

Figure 4A:
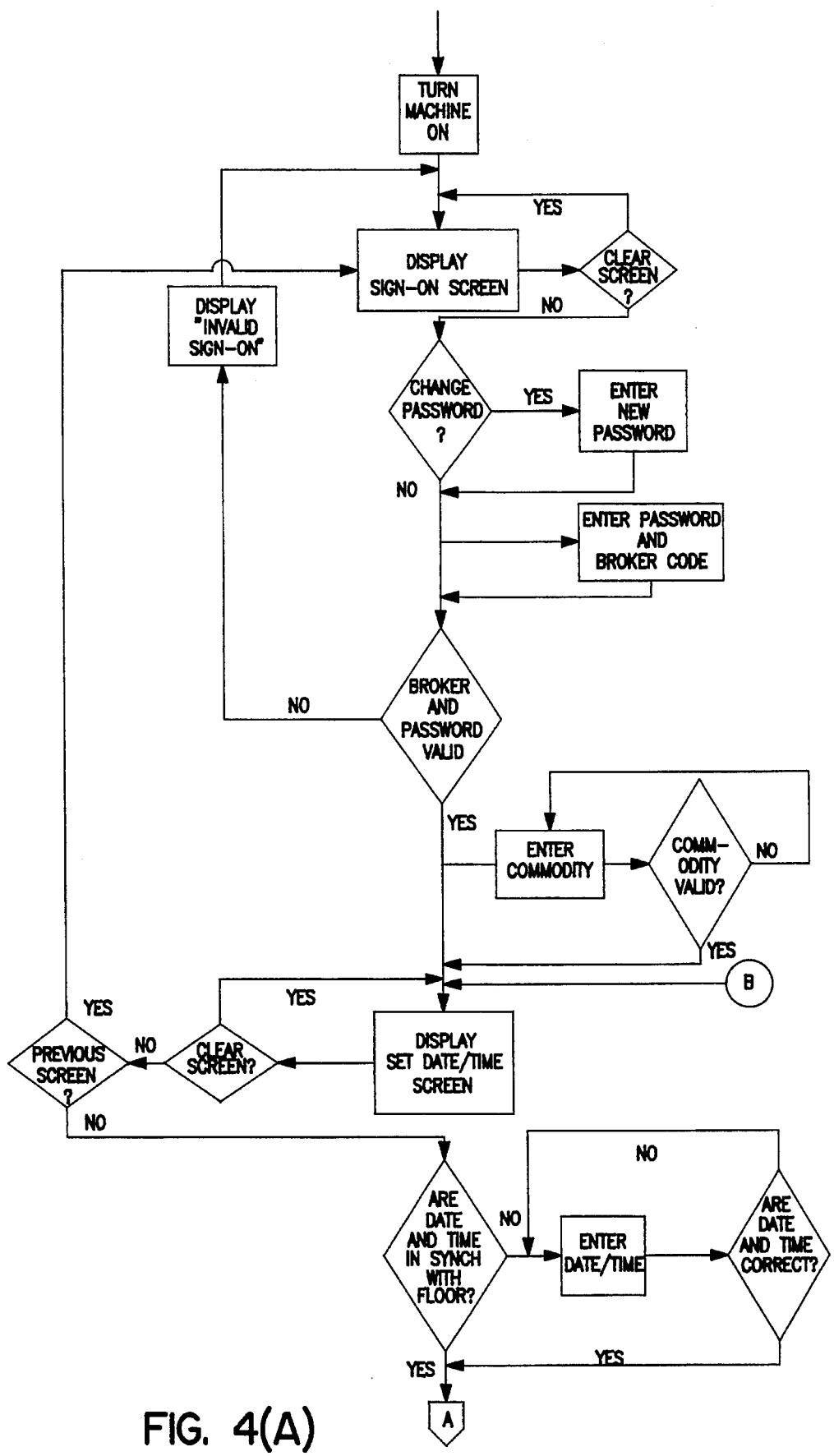
FIGS. 4A–4F are flowcharts explaining the use of the portable trade recordation and submission system.

A. Sign-On (FIG. 4A)

Figure 5:
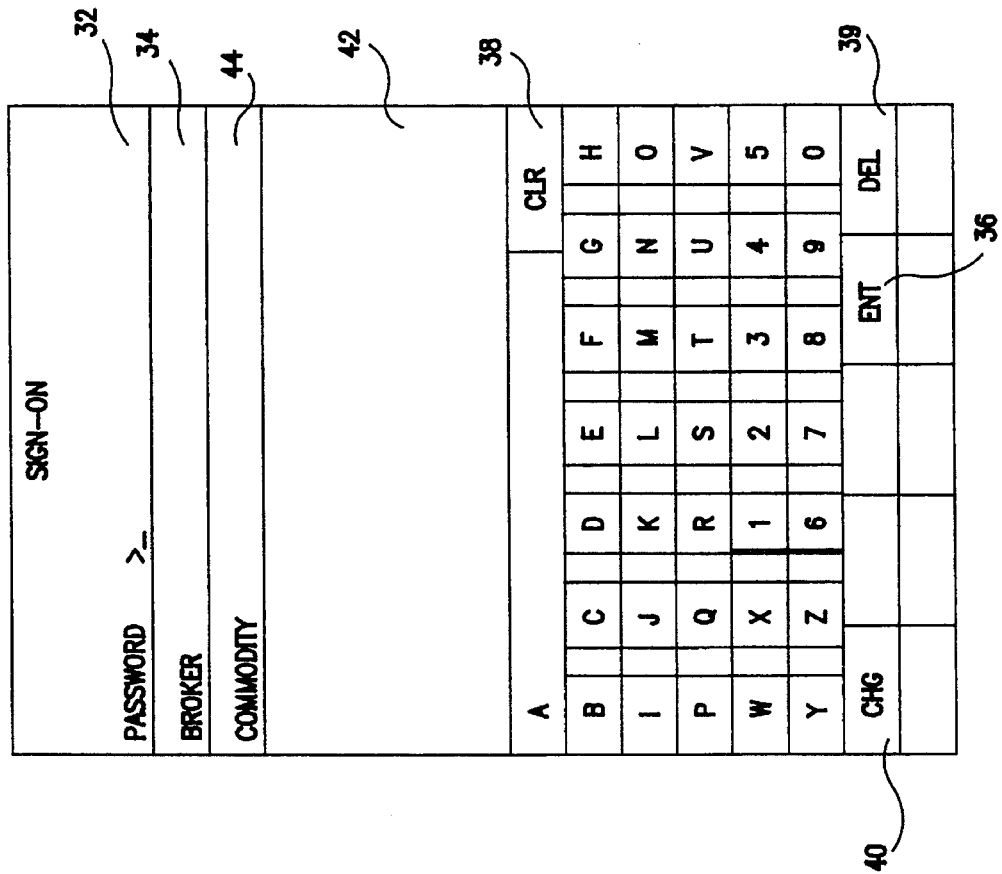
FIG. 5 illustrates a sign-on screen displayed by the portable trade recordation and submission system.

When the user turns on the system unit, the sign-on screen, FIG. 5, will be displayed.

Every user will have his own password for entry into the system. Additionally, there may be a master password which can be used by a staff member of an exchange to enter any user's portable trade recordation and submission system and view a password when a user has forgotten his password. These user passwords will be linked to the broker code, thereby restricting a user to entering trades only for himself. The user may then enter his four character password in the password field 32. Preferably, the password itself will not be displayed by the system as it is being entered. Asterisks may be displayed in lieu of each character, moving from right to left (right justified), pushing the first character out to the left. (This display method, moving from right to left, may be standard for all fields which are greater than one character.)

When a user receives a new computer never used before, he will sign on using password 9999, the standard password supplied with all new terminals.

An alphabetic or numeric broker code may then be entered in the broker field 34 and, if the password is not to be changed, the "ENT" (enter) field 36 is pressed.

At any time before or during the sign-on process, pressing the "DEL" (delete) field 39 will clear the screen and re-display a fresh sign-on screen. Pressing the "CLR" field 38 will clear a particular field.

If a valid broker code and password have been entered correctly, and the user wishes to change his password, he presses the "CHG" (change password) field 40 instead of the "ENT" field. All four characters of the new password may then be entered. (The new password can be displayed by the system while being entered.) At any point during this process, the delete field may be pressed to refresh the screen. After entering the password, the user should press "ENT".

Whether the password has been changed or the current password and broker code simply entered, "ENT" is pressed after each entry. If the password has been changed, then enter will alter the password and establish the broker code so that the new password will have to be used at subsequent sign-on's.

Once "ENT" has been pressed, if the original password and/or broker code are not correct, the system will display "Invalid Sign-On" in the message display area 42.

The user then enters the two character commodity code representing the commodity future or option to be traded (e.g., GC for gold futures, SO for silver options, etc.) in commodity field 44. Once the commodity code is entered, "ENT" is pressed to complete this screen.

B. Set Date/Time (FIG. 4A)

Figure 6:
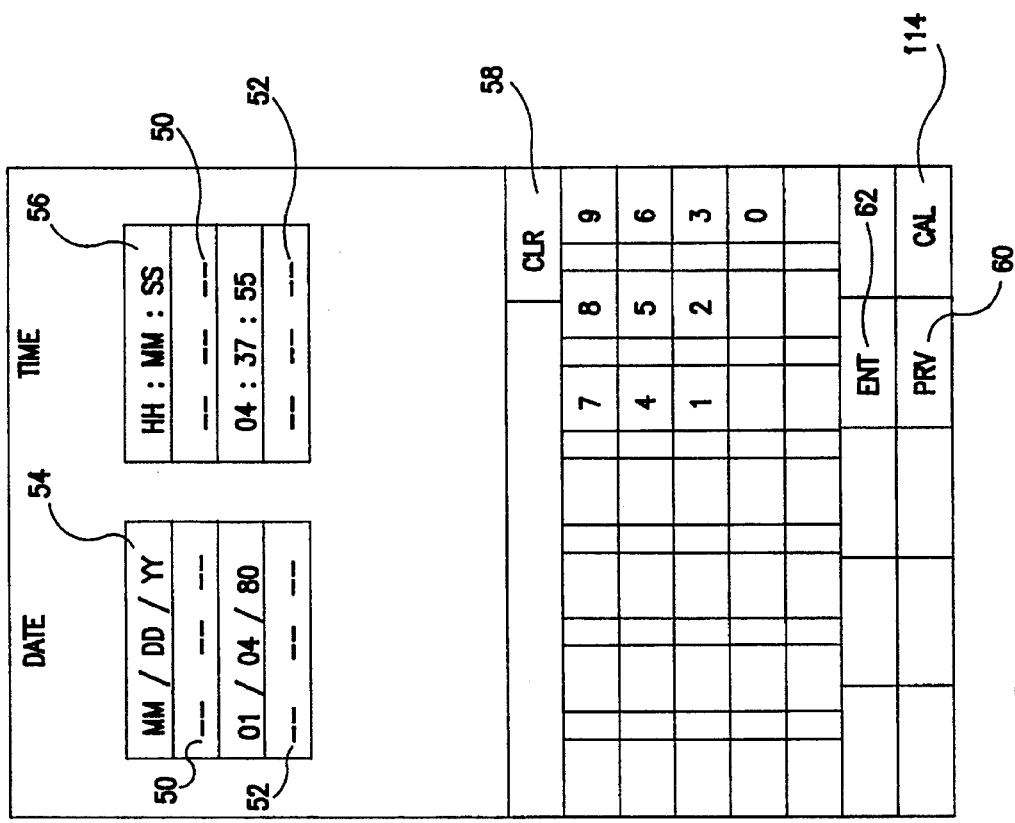
FIG. 6 illustrates a set date/time screen displayed by the portable trade recordation and submission system.

After a valid sign-on has occurred, the set date/time screen, FIG. 6, will be displayed by the system.

The date and time as stored in the machine are displayed on the screen. If this data does not correspond with the appropriate data and/or the time as displayed on the official wall clock on the trading floor, the incorrect data may be altered.

The date and time data may be altered in either of two ways. Firstly, the individual fields may be altered by using the plus ("+") and/or minus ("−") fields 50, 52. Alternatively, the "MM/DD/YY" field 54 may be pressed and the appropriate full date entered using the numeric pad displayed on the lower portion of the screen. The time may be altered in a similar fashion after pressing the "HH:MM:SS" field 56.

If at any time it is desired to clear the entry area of the screen, the "CLR" field 58 may be pressed. If it is desired to return to the sign-on screen, the "PRV" (previous screen) field 60 may be pressed.

It will be appreciated that an exchange may desire to restrict access to the set date/time screen to once per trading day or to an exchange staff member with a "master password". Therefore, access to this screen may be programmed flexibly enough to easily permit this change. Alternatively, the machine may be synchronized to, e.g., the Commodities Exchange Center Inc.'s ("CEC's") Price Reporting System clock either through direct wire connection or through RF transmission methods.

Figure 4B:
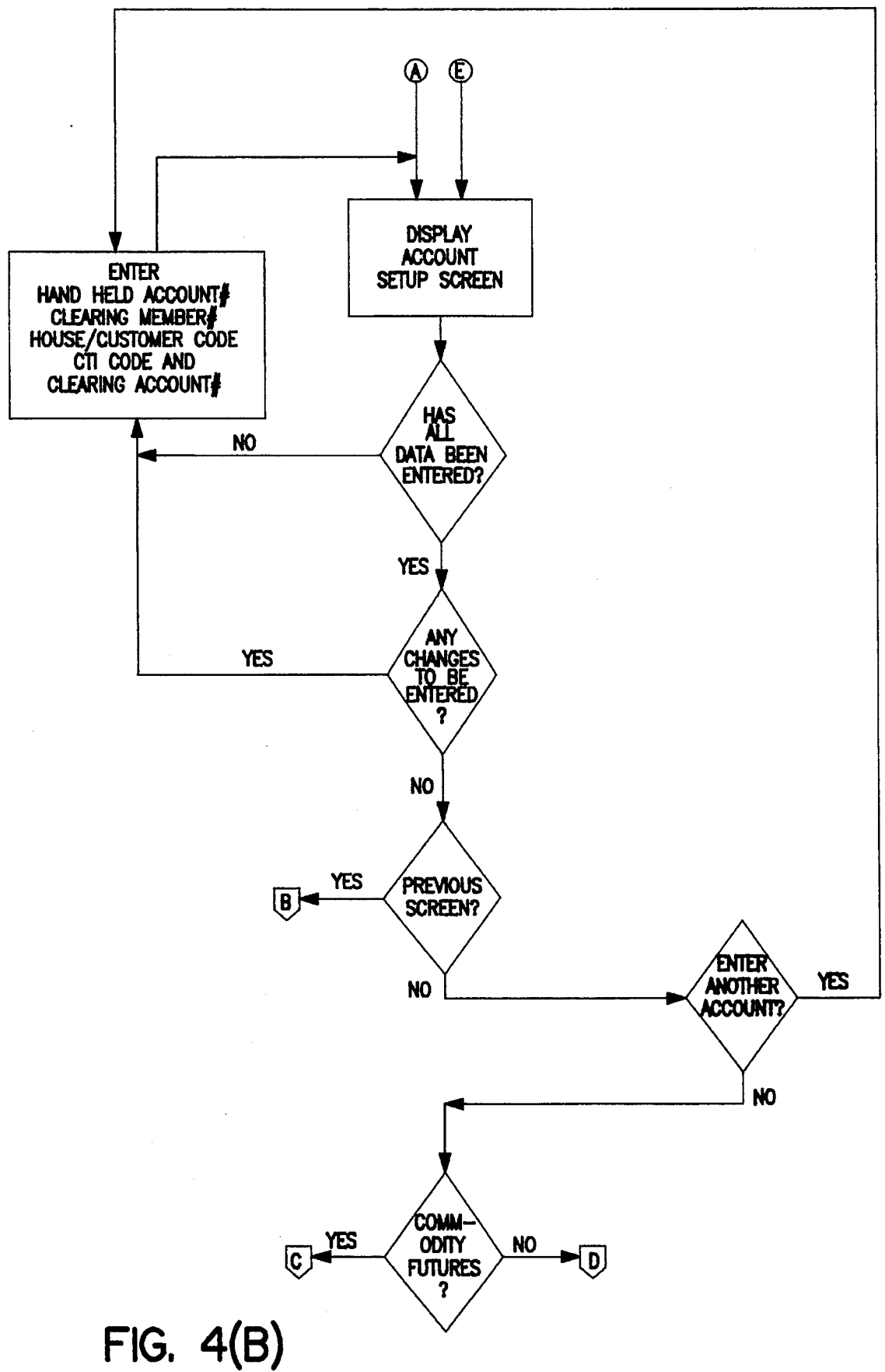
Figure 4C:
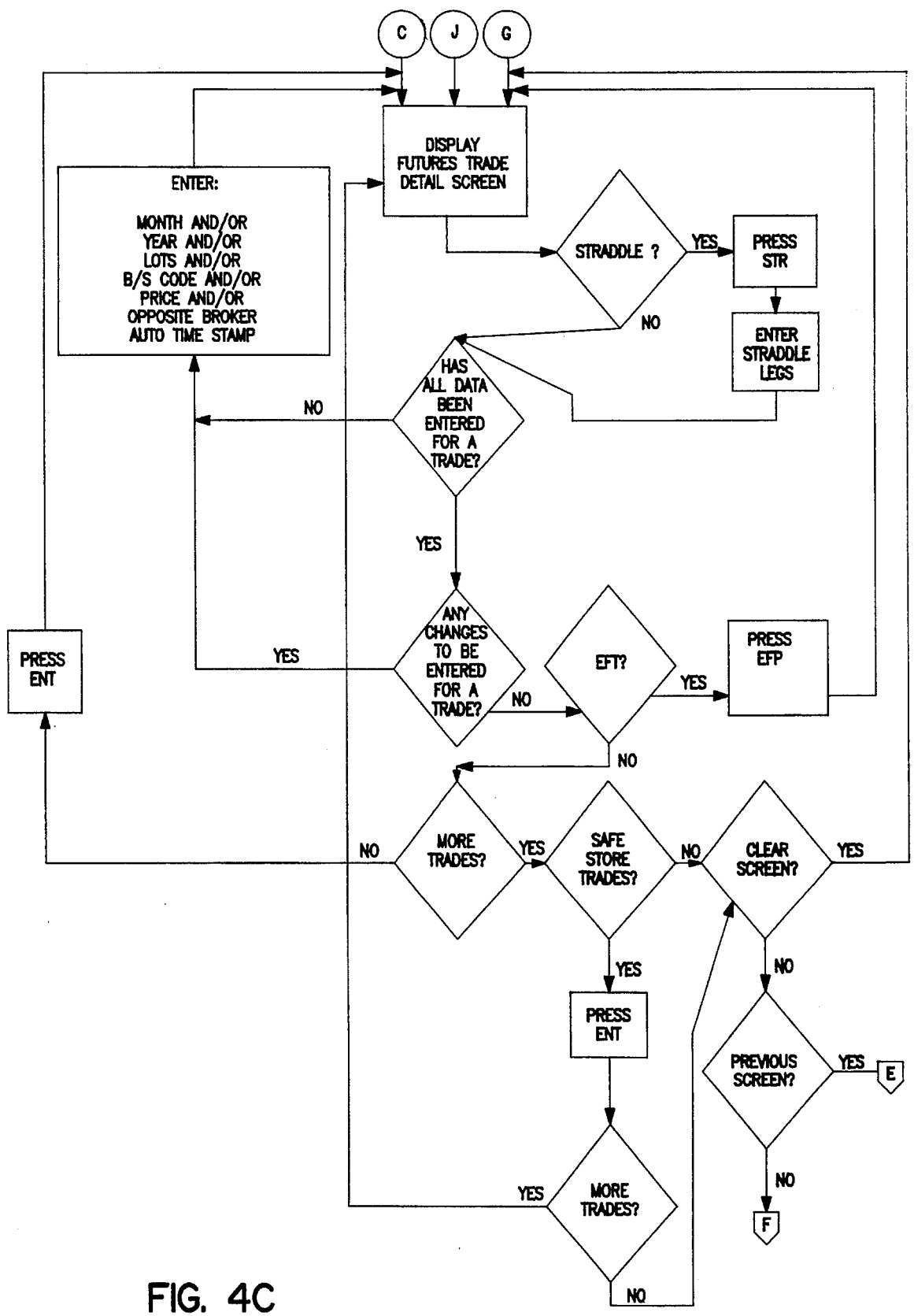

C. Account Setup (FIG. 4B)

If there is no need to alter the date or time, or changes to the date and/or time have been completed, the "ENT" field 62 may be pressed, and the account setup screen, FIG. 7, will then be displayed by the system. On this screen, multiple account records may be entered. Firstly the abbreviated account code ("AC") is entered followed by the data fields corresponding to the AC. The most frequently traded account may have a blank AC to minimize keystrokes on the trade detail screen. The clearing member code 72 may be entered. 'H' for house or 'C' for customer may be entered in the appropriate field 74, along with the appropriate customer type indicator ("CTI") code (1, 2, 3 or 4) 76, and the alphanumeric account code 70. Although a local trader primarily trades for his own account (CTI code 1), some local traders occasionally do trades for other members, their clearing members, or a customer (CTI codes, 2, 3, and 4). Therefore, entry of CTI codes should be required. The data entered will be displayed by the system on tile screen beneath the field titles. Entry on this screen can be concluded by pressing "ENT", "CLR" or "PRV" (previous screen) fields 78, 80, 82, respectively. "ENT" must be pressed to safe-store each record.

The data items on this screen are entered and placed in the appropriate fields. As numbers and letters are being touched, they appear in the universal entry field ("UEF") field 81, and are then entered into a specific location by touching that location. This novel entry technique affords accurate, rapid and flexible entry of data.

"CLR" may then be pressed to clear data from the UEF to begin entry on that screen all over again, or "PRV" pressed to go to the previous screen, or "ENT" pressed. If "ENT" is pressed the screen will verify that all fields have been entered. If not, any field not entered will be highlighted by the system. Once the fields have been entered, they will be safe-stored by the system to be automatically included with the detail trade information entered subsequently. All account records remain in the system until deleted. Backward ("BWD") field 83 and forward ("FWD") field 85 permit scrolling through the account records. "TRD" field 87 is pressed to proceed to the Future/Futures Options Trade Detail screens.

D. Futures/Futures Options Trade Detail FIGS. 4C and 4E)

Once all the fields have been entered and the "ENT" field pressed, the system will proceed to the futures trade detail screen, FIG. 8, if the commodity code entered was a futures code. If an options commodity code has been entered, the options trade detail screen, FIG. 9, will appear. At this point, the system is ready to begin trading and recording transaction data.

The futures trade detail screen permits entry of futures trade detail immediately after execution. This screen is adapted such that any field for up to five trades may be entered in any preferred order. For example, if it is preferred to enter each quantity field for up to five trades, they can be entered in whatever order chosen. This could be followed by entering the opposite broker for up to five trades. If instead, it is preferred to enter all the fields for one trade, the user may do so in whatever order he chooses.

In general, the numbers or letters to be entered into a field may be touched (they will appear in the "universal entry" field 92) and then the location where it is to be entered pressed and the system will edit the data and display it in the location indicated. Once the data is displayed in the location indicated, it will be automatically erased from the "universal entry" area. Additionally, there is a clear key 90 to the right of the "universal entry" area 92. Thus, if the numbers 1 followed by 0 (for 10) are touched and the quantity location ("QTY") 94 is touched, then 10 will appear in that location.

If the numbers 2 followed by 5 are touched and the quantity location 94 is touched, then 25 will appear in that location. Additionally, subsequent touches of the quantity location 94 on subsequent trade lines will cause 25 to appear in the quantity field on those lines.

Entry for the opposite broker field ("OPBK") 96 follows similar procedures. This field can be either alphabetic (2, 3, or 4 characters) or numeric (3 or 4 characters).

For the first trade of each day, the full price should be entered (e.g., 3632), except for the last digit of gold and silver which the system will automatically generate. (Thus, the price will be displayed similarly to the CEC's Price Reporting System's "Wallboard" Display Systems.) This first price of the day should be entered on the first trade line before any other prices. On subsequent lines, only the last one or two digits must be entered. For example, for the first trade price of $363.20, touch "3" "6" "3" "2" and those numbers will appear in the UEF, press the price location 98 and the UEF field will be emptied into that price location and will appear as 3632. It will be appreciated that pressing any part of this location just once is sufficient. For a second trade, done for example at $363.40, the user need only touch "4" and press the price location and the first 3 digits (363) will be carried down from the price field on the preceding line and the 4 which was touched will display as the last digit. Thus, the price on the second trade line will display as 3634. If, instead of touching only a 4, 754 is touched, then only the first digit of the preceding price would be carried down and the new price would display as 3754 (for $375.40). To duplicate the price on subsequent lines, the price location on the appropriate lines need only be touched.

The buy ("B")/sell ("S") code is set normally to "S". By simply pressing the buy/sell location 100, the field will change from its current state (e.g., "S") to its other state (e.g., "B").

On the first trade of the day, the contract month is entered by pressing the single character alphabetic indicator currently used on the trading floor and then pressing the month location. If it is a "red month" (i.e., the second occurrence of the month, or "year 2"), then "2" is touched prior to the month and the "YM" location 102 is pressed. There is a clear key 90 to the right of the UEF which clears data from the UEF.

Edits and validations are performed on price, commodity codes (on the sign-on screen), the year/year 2 field, contract months, and CTI codes (on the account set-up screen). Numeric fields are validated to ensure they are numeric and alphabetic fields are validated to ensure they are alphabetic.

The broker and opposite broker fields may be either 3 or 4 numerics or 2, 3 or 4 alphabetic characters. The clearing member code (entered in the account setup screen) should be 3 digits. The size of the price fields as entered for each commodity are:

| COMMODITY | SIZE |
|---|---|
| GOLD | NO LESS THAN 4 AND NO MORE THAN 5 |
| SILVER | NO LESS THAN 4 AND NO MORE THAN 5 |
| COPPER | NO LESS THAN 4 AND NO MORE THAN 5 |
| HI-GRADE COPPER | NO LESS THAN 4 AND NO MORE THAN 5 |
| ALUMINUM | NO LESS THAN 4 AND NO MORE THAN 5 |
| MOODY'S | NO LESS THAN 4 AND NO MORE THAN 5 |
| GOLD OPTION | NO LESS THAN 1 AND NO MORE THAN 5 |
| SILVER OPTION | NO LESS THAN 1 AND NO MORE THAN 5 |
| COPPER OPTION | NO LESS THAN 1 AND NO MORE THAN 5 |
| HI-GRADE COPPER OPTIONS | NO LESS THAN 1 AND NO MORE THAN 5 |

For gold and silver futures, the last zero will be supplied by the system. For example, a gold trade executed at $450.50 would only require entry of 4505. A silver trade executed at $555.50 would require 5555. A copper trade or Hi-Grade copper trade of 1.0675 requires the entire 5 digits, as does aluminum and Moody's Index.

The last digit displayed in Gold and Silver prices can be any digit while Moody's Index, Hi-Grade Copper, Copper, or Aluminum prices can only contain a 0 or 5 as the last digit.

Valid commodity codes are:

| FUTURES | OPTIONS |
|---|---|
| AL (ALUMINUM) | OG (GOLD OPTIONS) |
| CU (COPPER) | OP (COPPER OPTIONS) |
| GC (GOLD) | SO (SILVER OPTIONS) |
| SI (SILVER) | HX (HI-GRADE COPPER OPTIONS) |
| MI (MOODY'S) | |
| HG (HI-GRADE COPPER) | |

Strike prices should be positive numeric values, maximum of four digits and a minimum of three. The yr/2 code permits a blank or a "2". The month codes are, e.g., F, G, H, J, K, M, N, Q, U, V, X, Z. The CTI codes in the account set-up screen are, e.g., 1, 2, 3, or 4.

The buy/sell indicator and year/month fields are presumed not to change unless otherwise indicated. This saves the time required for up to four touches. (The year/month field is a single field.) Thus, if the last buy/sell indicator displayed on the screen shows "S", then unless changed, the system will assume that all subsequent trades wherein the quantity, price, or opposite broker have been entered and are displayed, will be sells. The same is true for year/month. Unless each is specifically changed, the system will assume that subsequent trades deal with the same month. Therefore, once either the quantity, price, or opposite broker have been entered for one trade, the system will generate the entry and display for the year/month field. If it is desired to change the buy/sell code, the appropriate buy/sell location is pressed and it will "toggle" to its "other" value; if it is desired to change the year/month, the appropriate entry is touched and the appropriate location is pressed.

When "ENT" field 104 is pressed, all completed trades may be safe-stored on both internal RAM and the removable RAM card. Trades may be safe-stored in both clear and encrypted formats. The audit trail time stamp (HHMMSS) occurs as soon as either the quantity, price, or opposite broker field has been entered for each trade line.

After "ENT" has been pressed, completed trade lines may be safe-stored in both internal RAM and removable RAM card and scrolled off the trade entry portion of the screen and displayed in the "entered and safe-stored" portion of the screen (delimited by the horizontal line on the screen) leaving only the two last entered trades displayed at the two top most lines of the "entered and safe-stored" portion of the screen. No incomplete trades will be scrolled off the screen.

Subsequent to pressing "ENT", any field which is displayed in the "entered and safe-stored" portion of the screen may be altered by following the same basic procedures employed at initial trade entry. Thus, to change price, 1 to 5 numbers would be entered and the appropriate price location would be pressed. To alter the buy/sell code, the appropriate buy/sell location would be pressed toggling from one value to the other.

When a change occurs to a trade record subsequent to the "ENT" key being pressed (which causes the safe-storing of that record), the system will alter the "transaction type" in position 1 of the original record stored in internal memory (main trade file, as discussed more fully below), and the original record on the removable RAM card to a "C" indicating that the record has been changed; then store the newly updated record in internal memory and on the removable RAM card in both clear and encrypted formats. Additionally, positions 40–44 and 71 of the main trade file record will be updated (in packed format) with the correction time (HHMMSS) and positions 72–75 with the corrected trade ID. The new corrected record will also retain the original audit trail time.

All subsequent accesses of the main trade file for purposes of retrieval, position display, or profit and loss calculation will bypass the corrected records.

The user may browse backward as far as necessary to display and correct trades and this screen may also display a running net of all buys and sells (buys "+", sells "−") for a selected account.

There are straddle trades executed at price differentials which are immediately priced by both brokers and recorded and submitted as separate straddle legs. As preferably embodied, the system is particularly adapted to assist the user in pricing, recording and submitting this latter type of straddle.

If a straddle trade is executed at a price differential both legs of the straddle should be entered, one right after the other. As part of the first leg, "STR" field 106 is first pressed, the differential (+ or −) will be entered in the price field, the non-base year/month, lots, and opposite broker will be entered. The system will keep the record in temporary storage and will cause a second trade detail line to be displayed with the lots and opposite broker fields carried forward from the prior line. The base month and base price may then be entered and the user will press "ENT" to safe-store both trade records. Before safe-storing the trades, the price of the first leg of the straddle may be calculated by adding the differential to the base price of the second leg. Both legs may be time-stamped at the time the first field of either price, quantity, or opposite broker was entered. The trade type will be stored as an "S".

EFP's are entered similarly to outright trades but instead of pressing "ENT", "EFP" field 107 is pressed. This performs the same functions as ENT except it makes the trade type an EFP (trade type 6).

Figures 9, 10:
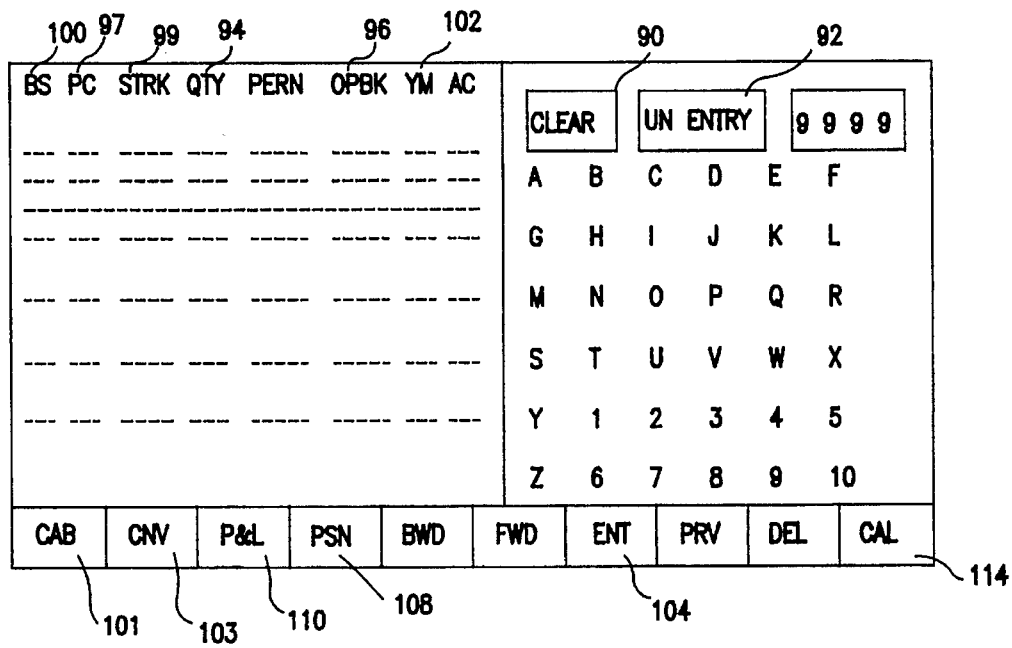
FIG. 9 illustrates an options trade detail screen displayed by the portable trade recordation and submission system.
FIG. 10 illustrates a review positions-futures screen displayed by the portable trade recordation and submission system.

Option trades will be entered using the Option Trade Detail Screen, FIG. 9. These trades differ from futures trades in that the Put/Call Codes ("P" or "C") and the strike price must also be entered. Except for the inclusion of these two fields 97 and 99, respectively, the procedures involved in trade recordation of option trades parallel those described for futures. Accordingly, similar numbers indicate similar fields.

Option trading also permits cabinet trades (trades priced at $1 to liquidate out of the money option position) and conversion trades (options and futures legs). To enter a cabinet trade, the relevant trade data is entered, but a price is not entered. "CAB" field 101 is then pressed instead of "ENT". The system then edits and validates the data, ensures that the price field is blank, safe-stores the trade record, and makes the trade type "C" for cabinet. The blank price field may be changed to $1 in an exchange's trade processing computer.

If the trade is a conversion trade, then it has three legs to it. The first two are option legs and the third is a futures leg. After entering the first leg, "CNV" field 103 is pressed and the system will edit and store that leg and await the entry of the second option leg. After the second option leg has been entered, "CNV" is pressed and the system edits and stores that leg and displays a futures trade detail screen for the related future. The futures leg of the conversion is then entered and "ENT" pressed. Once "ENT" has been pressed, the third leg may be edited and stored. The system can then return to the options trade detail screen. All three trade records will be time-stamped with the time of the first entry of price, quantity, or opposite broker in the first leg.

Figure 4D:
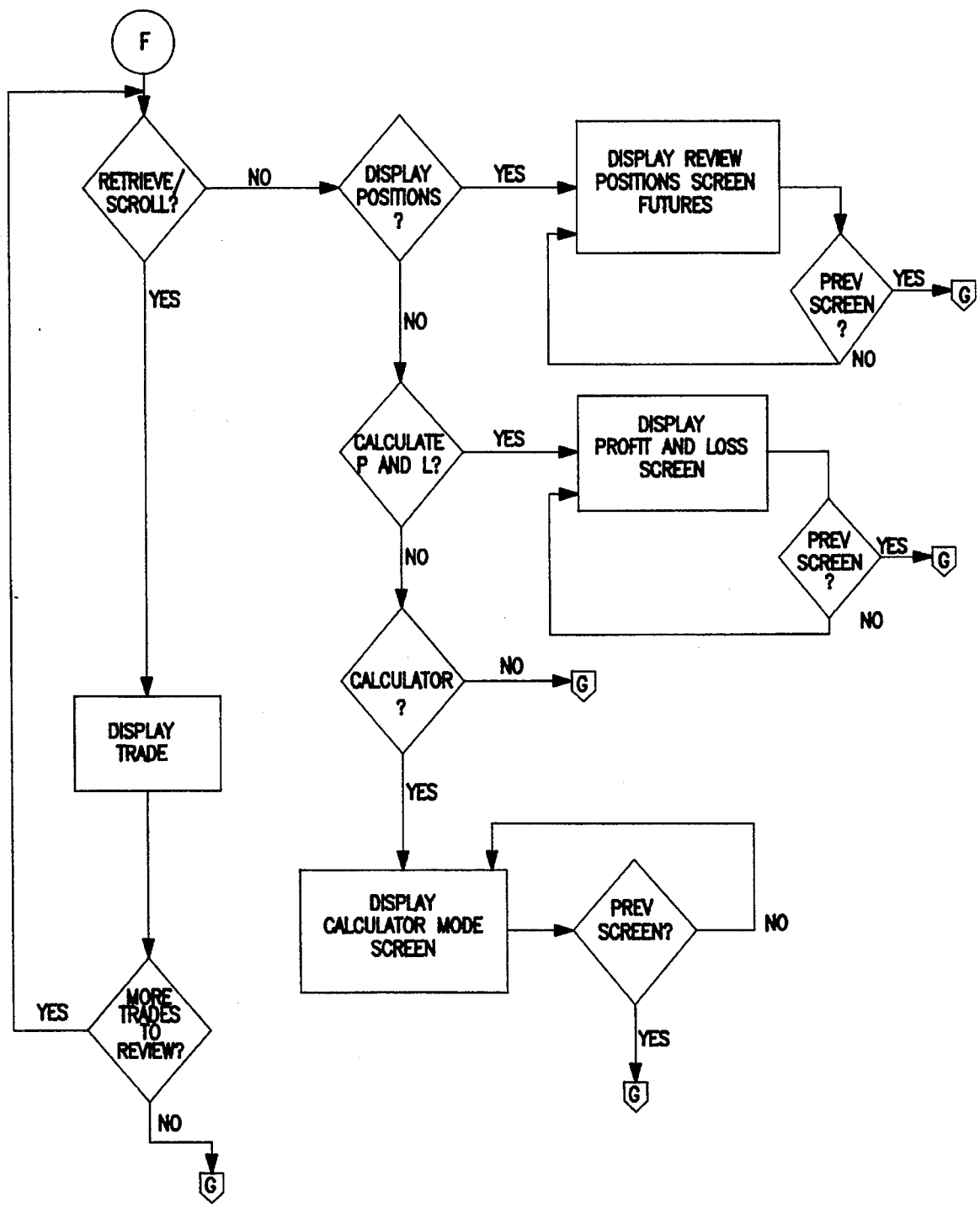
Figure 4E:
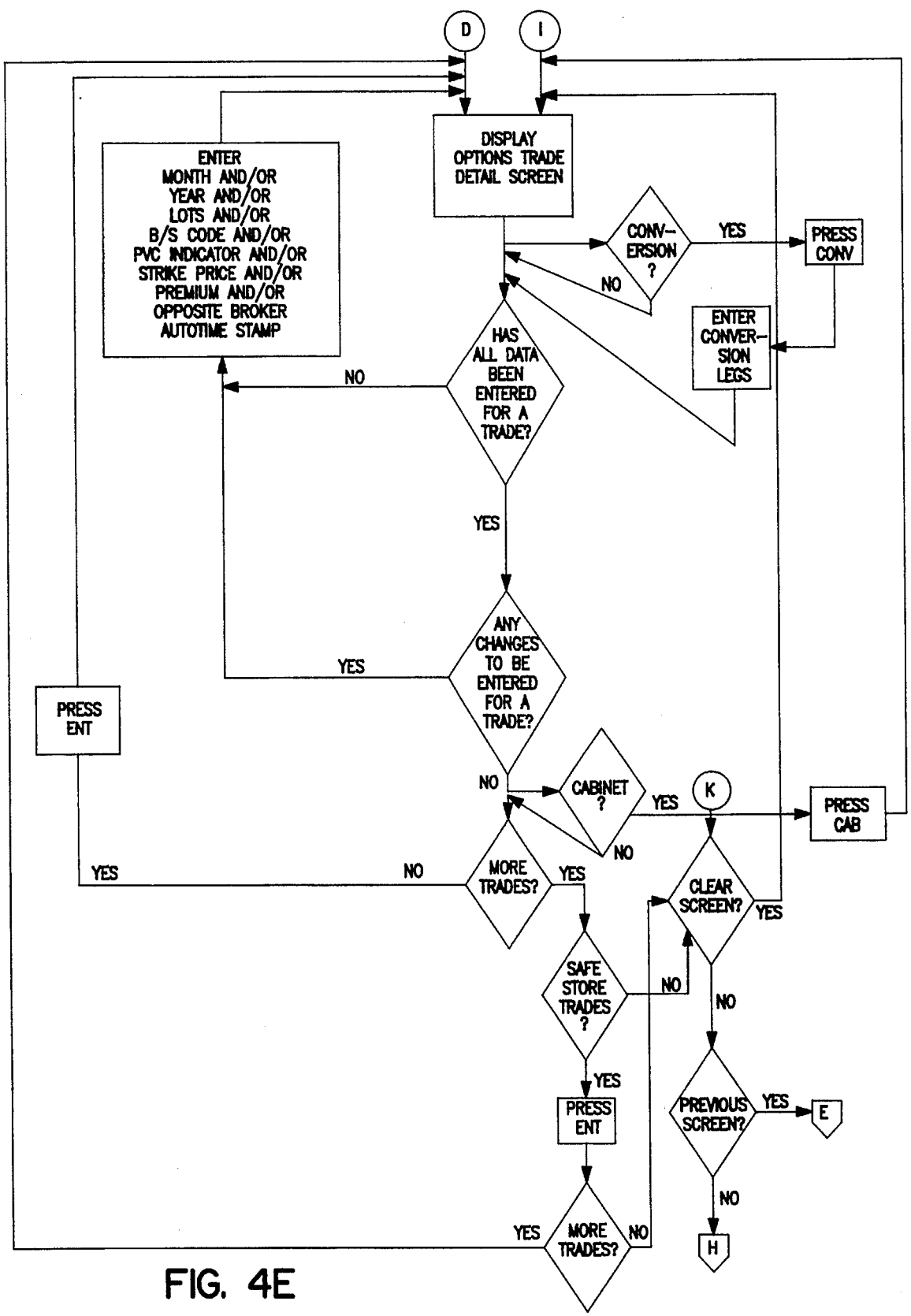
Figure 4F:
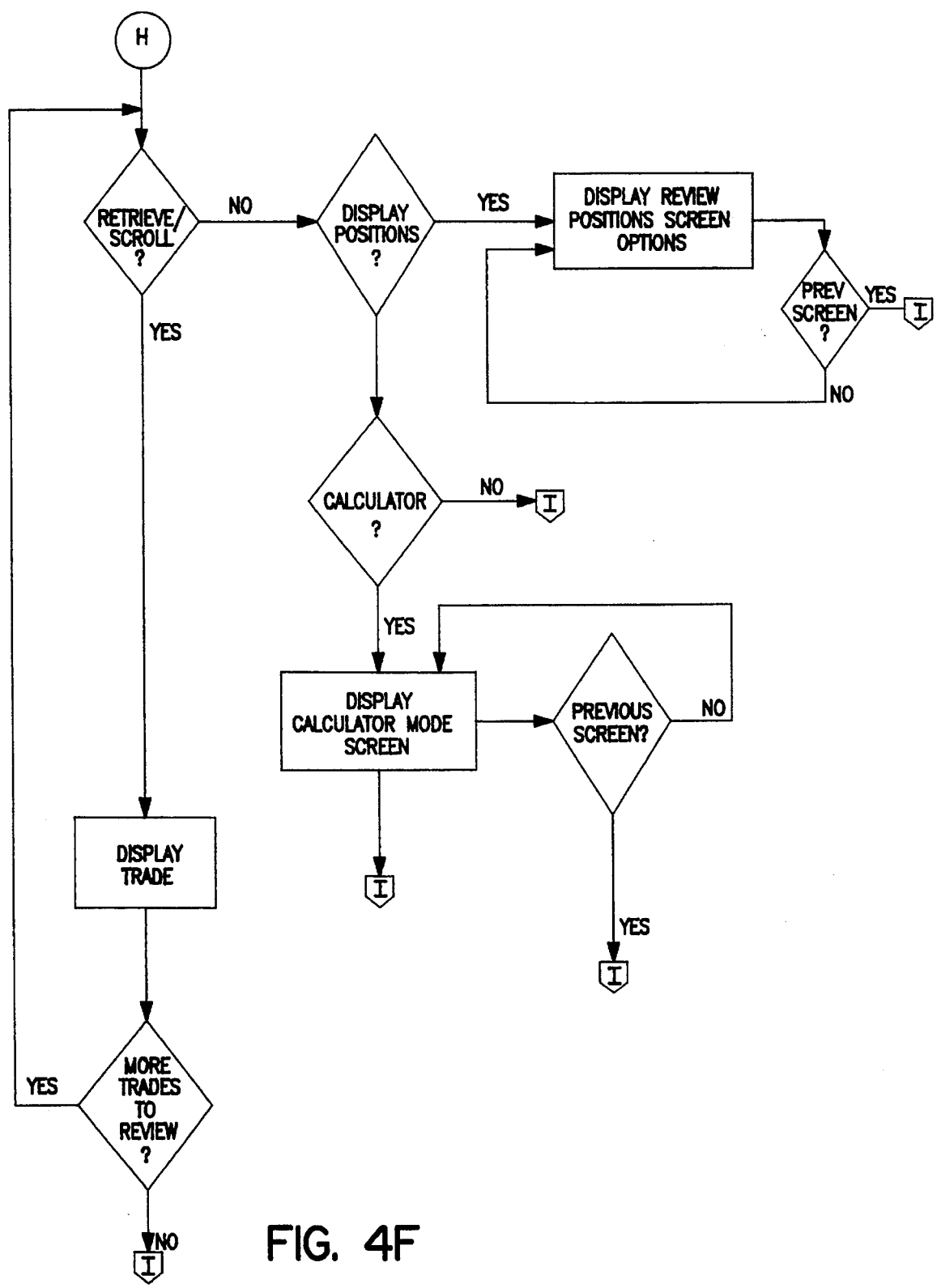

E. Review Positions (FIGS. 4D and 4F)

Throughout the trading day, a user may want to review and/or correct a previously entered trade, review his position in the various contract months, and the net dollar value of all his trades.

All trades are accessed via the futures/options trade detail screens, FIGS. 8 and 9, using the browse capabilities to locate the appropriate trade(s). Corrections are made just as original entries, i.e., by touching the new numbers or letters to be entered, and then touching the location wherein they are to be placed.

To review the users positions in each contract month, "PSN" field 108 is pressed and the review positions screen—futures, FIG. 10, or review positions screen—options, FIG. 11, will be displayed showing each month traded in nearest-to-farthest, out-month-order, calls-before-puts, lowest-to-highest strike prices.

To review profit and/or loss by contract month, "P&L" field 110 is pressed. The system will then display each month traded in nearest-to-farthest-out-month-order and the net dollar profit or loss, with a total profit and loss on the last line.

The P&L field 110 will also be present on the review position screen—futures, FIG. 10, to permit review of profit and loss immediately after reviewing positions. Additionally, the "PSN" field 112 will be present on the profit & loss screen FIG. 12 to permit the user to quickly go back to review his positions.

As trades are being safe-stored, the system maintains a separate record (position record) for each futures contract year/month traded. Options further break the "contract series" down by put/call code. This record may contain, for a particular account, the number of buy lots, the number of sell lots and a total buy value (lots X price) and a total sell value (lots X price) for all trades done at each price within each contract month.

When review positions function ("PSN") 112 is pressed, the system may read the position records and display the buy lots (long positions), sell lots (short positions) and the contract year/month. "YR" field 113 is pressed to toggle between current year and the following year.

When the profit and loss field 110 is pressed, the system may subtract the long positions from the short (resulting in "remaining positions") and the buy value from the sell value for each contract month and multiply the remainder times the contract multiplier for each commodity. (Contract multipliers are, e.g., GOLD - 100, SILVER - 5,000, MOODY'S INDEX - 500, COPPER - 25,000, HI-GRADE - 25,000, ALUMINUM - 44,000.) This results in the profit/loss for each month. The system may display this as shown on the profit and loss screen, FIG. 12. A total of all the months profits and loss will also be displayed.

For those months with remaining positions greater than zero the system may request optional entry of the current market or settlement price and the user may enter each month's market or settlement price and press "ENT". Once "ENT" has been pressed, the remaining positions will be marked to market and the profit and loss figures will be adjusted accordingly.

To mark to market, the remaining lots can be multiplied times the market or settlement price and then times the contract multiplier to produce the market value. If the remaining positions are long, the market value can be made negative. The system may then add the market value to the profit and loss.

One of the additional features provided by the portable trade recordation and submission system is a "calculator mode" shown in FIG. 13. This mode will be available from the screens shown in FIGS. 6 through 12 by pressing the "CAL" field 114 which will display the calculator mode screen, FIG. 13. Return from calculator mode may be to the previous screen by pressing the "PRV" field 116. Once in calculator mode, the numeric fields and the conventions of +, −, *, /, = may be used for arithmetic functions of plus, minus, multiplication, division and equals.

When the system writes a record to RAM and the diskette, it can sequentially write 80 byte records in both the encrypted and clear formats. A typical 80 byte record format is as follows:

| Field Name | Type (Alpha/Numeric) | Position | Length (Characters) |
|---|---|---|---|
| Transaction Type ('1' = Futures) | A | 1 | 1 |
| ('2' = Options) | | | |
| ('C' = Corrected) | | | |
| Commodity Code | A | 2–3 | 2 |
| Clearing Member Number | N | 4–6 | 3 |
| Customer Type Indicator | N | 7 | 1 |
| Customer/Order Number (Account No.) | A | 8–17 | 10 |
| Broker | A | 18–21 | 4 |
| Put/Call Indicator | A | 22 | 1 |
| Page Number | A | 23–24 | 2 |
| Buy/Sell Code | A | 25 | 1 |
| House/Customer Code | A | 26 | 1 |
| Contract Month | A | 27 | 1 |
| Year | A | 28 | 1 |
| Quantity (Lots) | N | 29–32 | 4 |
| Price (Premium) | N | 33–38 | 6 |
| Correction Time (HHMMSS) | A | 40–44 | 5 |
| Straddle Type Indicator | A | 45 | 1 |
| Trade Type | A | 46 | 1 |
| As-Of Date | N | 47–51 | 5 |
| Filler | A | 52–54 | 3 |
| Opposite Broker | A | 55–58 | 4 |
| Strike Price | N | 59–64 | 6 |
| Execution Audit Trail Time (HHMMSS) | N | 65–70 | 6 |
| Last Digit of Correction Time | N | 71 | 1 |
| Corrected Trade ID | A | 72–73 | 5 |
| Transaction ID (Current Rec.) | N | 74–79 | 6 |
| Bust/Correct Code | A | 80 | 1 |

Once the removable storage device 16 is removed from the portable trade recordation and submission system and is received by a broker's clerk, there are several methods by which the transaction data can be submitted to the exchange.

The removable storage device may be processed by a broker or clearing member using an IBM PC or equivalent. Trade records from the portable trade recordation and submission system may be "up-loaded" to the PC. PC programs may permit the display of trade records in the appropriate format. All fields except the trade date and the execution time fields may be corrected or expanded as appropriate. All edits and validations of altered data should be the same as on the portable trade recordation and submission system. From the PC, the data may be submitted, either on diskette or via communication line transmission, to the clearing member or to the exchange.

The encrypted records may also be processed through a special exchange-owned PC workstation to review data as entered and uncorrupted by allocation and editing processes necessarily performed after trade execution.

Once the transaction data has been submitted by the user, data will be submitted to the exchange via the normal means of submission of trade data to the exchange.

Once received by the exchange, the trade records may be edited, validated and loaded into the exchange's database like any other trade data.

It will be appreciated that the portable trade recordation and submission system can be used with or without a printer. The printout of each trade as it is executed and entered into the terminal could serve as a second level (RAM card is primary) back-up in case of system failure.

As preferably embodied, in order to limit the size and complexity of the system, there is no provision in the hand-held machines to "bust" or "correct" trades once they have been submitted. This will continue to be a function for the clerks subsequent to initial trade submission. If a trade has been submitted incorrectly, the broker may simply instruct his clerk to "bust" or "correct" it using the normal trade correction procedures.

The portable trade recordation and submission system has been designed to minimize the number of keystrokes when entering trades. Therefore, the fields on both the futures and options trade detail screens should be entered from top to bottom. However, if a particular user prefers, the fields can be entered in whatever order desired.

Brokers currently use their trading cards as audit trails for personal, Commodities Futures Trading Commission ("CFTC"), and CFTC compliance (trade accuracy and timing) purposes. The portable trade recordation and submission system has two acceptable procedures which will permit the retention of trades on a physical medium for audit trail purposes. Firstly, the RAM cards can be retained. Secondly, at the end of each trading day, the portable trade recordation and submission system can be linked to a personal computer via RS232 interface and the trades can be printed and "dumped" to diskette and the diskette retained.

Recovery in case of system failure should permit the submission of all trades executed and entered into the portable trade recordation and submission system prior to failure. This can be accomplished by removing the specialized RAM card from the failed system and submitting it to the appropriate broker or clearing member.

Recovery may also permit the user to review an entire day's positions and profit/loss for the entire day. These two functions mandate the inclusion of the number of lots, the price, and the contract months (and strike prices and put/call codes for options) for all trades both before and after the failure. To accomplish this, when trades are stored, the lots and prices (separated by buys and sells) within a contract month will be kept in special records on the RAM card and in internal RAM. If a machine were to fail, the user would remove the RAM card and insert it in a back-up system. The back-up system would recognize that there is a RAM card wherein the special record has data. The system may then write all the records to RAM and the user can continue where he left off.

It will be appreciated by those skilled in the art that the portable trade recordation and submission system described herein is also applicable to "dual trader" applications. A dual trader is defined as a floor trader who trades for customers as well as himself. For dual traders, account and customer type information must be recorded on a per trade basis.

This description includes additional material concerning the application software which is submitted in the form of Appendices A-N listed in the table below. The appendices are available in microfiche as mentioned at the beginning of the specification.

| MICROFICHE TABLE OF CONTENTS | | |
|---|---|---|
| APPENDIX | DESCRIPTION | REFERENCE NO. |
| A | Library Functions | NYNEXLIB |
| B | I/O Routines (Horizontal) | NYNEXIOH |
| C | Main Program Module | COMEXMAIN00 |
| D | Create SAVE.X File | NYNEX000 |
| E | Sign-on Screen | NYNEX001 |
| F | Date/Time Screen | NYNEX002 |
| G | Account Setup Screen Screen | NYNEX003 |
| H | Futures Trade Detail Screen | NYNEX004 |

-continued

| MICROFICHE TABLE OF CONTENTS | | |
|---|---|---|
| APPENDIX | DESCRIPTION | REFERENCE NO. |
| I | Options Trade Detail | NYNEX005 |
| J | Futures Position Screen | NYNEX009 |
| K | Option Position Screen | NYNEX010 |
| L | Profit and Loss Screen | NYNEX011 |
| M | Calculator Screen | NYNEX012 |
| N | I/O Routines (Vertical) | NYNEXIOV |

While the invention has been described in its preferred embodiments, it is to be understood that the words which have been used are words of description, rather than limitation, and that changes may be made within the purview of the appended claims without departing from the true scope and spirit of the invention in its broader aspects.

What is claimed:

1. A method of selectively entering data into one of a plurality of data records displayed on a display screen of a data entry apparatus, comprising the steps of:

(a) displaying an edit area on the display screen containing the plurality of data records, each data record having a plurality of character fields, a plurality of which are more than one character and which are used in a complete transaction;

(b) displaying an entry field on the display screen;

(c) displaying input data entered on the data entry apparatus in said entry field;

(d) transferring input data displayed in said entry field to a character field of a data record of said plurality of data records by direct user indication of said character field on the display screen;

(e) storing completed data records of said plurality of data records in a memory;

(f) removing said completed data records from the edit area of the display screen; and (g) retaining incomplete data records of said plurality of data records in the edit area of the display screen;

wherein said steps of storing, removing, and retaining are performed upon activation of at least one field.

2. A method of selectively entering data into one of a plurality of data records displayed on a display screen of a data entry apparatus according to claim 1, further comprising the step of transferring data displayed in said character field of said data record to a corresponding additional character field of an additional data record by direct indication of said corresponding additional character field on the display screen.

3. A method of selectively entering data into one of a plurality of data records displayed on a display screen of a data entry apparatus according to claim 1, further comprising the steps of:

(a) displaying additional data entered on the data entry apparatus in said entry field;

(b) transferring data displayed in said character field of said data record to a corresponding additional character field of an additional data record by direct indication of said corresponding additional character field on the display screen and;

(c) replacing the least significant digits of the data transferred from said character field of said data record with said additional data displayed in said data entry field.

4. A method of selectively entering data into one of a plurality of data records displayed on a display screen of a data entry apparatus according to claim 1, further comprising the step of displaying at least one of said completed data records in a display area of the display screen.

* * * * *